(12) United States Patent
Kubo (10) Patent No.: US 8,081,976 B2
(45) Date of Patent: Dec. 20, 2011

(54) MOBILE RADIO TERMINAL AND BASE STATION SEARCH METHOD

(75) Inventor: Yoshiyuki Kubo, Tokyo (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 142 days.

(21) Appl. No.: 12/724,124

(22) Filed: Mar. 15, 2010

(65) Prior Publication Data

US 2011/0045829 A1 Feb. 24, 2011

(30) Foreign Application Priority Data

Aug. 21, 2009 (JP) ................................ P2009-192462

(51) Int. Cl.
 *H04W 4/00* (2009.01)
(52) U.S. Cl. .................... 455/434; 370/280; 342/357.77
(58) Field of Classification Search .................. 455/434, 455/550.1, 456.3; 342/357.77; 370/280
 See application file for complete search history.

(56) References Cited

U.S. PATENT DOCUMENTS

| | | | |
|---|---|---|---|
| 4,768,229 A | 8/1988 | Benjamin et al. | |
| 5,881,372 A | 3/1999 | Kruys | |
| 7,024,191 B2 | 4/2006 | Ofuji et al. | |
| 2003/0045299 A1* | 3/2003 | New | 455/455 |
| 2006/0246890 A1 | 11/2006 | Yasuda et al. | |
| 2010/0009679 A1* | 1/2010 | Kim et al. | 455/434 |

FOREIGN PATENT DOCUMENTS

| | | |
|---|---|---|
| JP | 2001-313982 A | 11/2001 |
| JP | 2003-060551 A | 2/2003 |
| JP | 2006-311329 | 11/2006 |
| WO | WO 2004/036940 A1 | 4/2004 |

OTHER PUBLICATIONS

Related U.S. Appl. No. 11/241,307, filed Sep. 30, 2005; First-Named Inventor; Chikara Yasuda; Title: "Mobile Radio Terminal Apparatus."

* cited by examiner

*Primary Examiner* — Phuoc Doan

(74) *Attorney, Agent, or Firm* — Maschoff Gilmore & Israelsen (57) ABSTRACT

A mobile radio terminal of the present invention searches for a base station by a first search method by using a frequency at which an electric field strength of a radio signal has a reference value or more, searches for the base station by a second search method by using the frequency group usable for communication with the base station belonging to the mobile communication network, searches for the base station by the first search method until a number of searches by the first base station search method corresponds to an upper limit value of a number of searches, and searches for the base station by the second search method when the base station search by the first search method does not succeed by a time when the number of searches for the base station by the first search method corresponds to the upper limit value.

26 Claims, 9 Drawing Sheets

MOBILE RADIO TERMINAL AND BASE STATION SEARCH METHOD

CROSS-REFERENCE TO RELATED APPLICATION

This application is based upon and claims the benefit of priority from the prior Japanese Patent Application No. 2009-192462 filed on Aug. 21, 2009; the entire contents of which is incorporated herein by reference.

BACKGROUND OF THE INVENTION

1. Field of the Invention

The present invention relates to a mobile radio terminal and a base station search method, and particularly relates to a mobile radio terminal and a base station search method which can reduce power consumption in the case of searching for a base station.

2. Description of the Related Art

If a mobile radio terminal in an out of service area state searches for a base station in order to return to an within-cell range state, the mobile radio terminal firstly measures power strength of the received signal (RSSI: Received Signal Strength Indicator) that the mobile radio terminal receives from surrounding base stations, and searches for only the base stations to which the frequencies at which the measured received signals have the RSSI values each of a specified threshold value or more are assigned (for example, see Patent Document 1 (Japanese Patent Laid-Open No. 2006-311329). Thereby, useless search for the base stations to which the frequencies with no RSSI values are assigned can be prevented, and the power consumption in the base station search in the case where the mobile radio terminal is in an out of service area state can be reduced.

SUMMARY OF THE INVENTION

However, there may be a case where only poor correlation exists between the fact that the RSSI value of the received signal which the mobile radio terminal receives from a surrounding base station is a specified threshold value or more, and the fact that the mobile radio terminal can establish synchronization with the radio frame transmitted from a base station and can find out the base station to communicate. More specifically, even if the RSSI value of the received signal at a certain frequency is not a specified threshold value or more, it is sometimes possible to establish synchronization with the radio frame from the received signal at the frequency, and find out the base station to communicate. On the other hand, under the situation in which a number of interference signals exist around the mobile radio terminal, even if the RSSI value of the received signal at a certain frequency is a specified threshold value or more, it is sometimes impossible for the mobile radio terminal to establish synchronization with the wires frame from the received signal and find a base station to communicate due to the interference signals. In such a case, it may be difficult to detect the frequency which enables search of the base station, by indiscriminately performing cutoff point determination process according to the RSSI value with a specified threshold value. As a result, if the mobile radio terminal searches for a base station by using cutoff point determination according to the RSSI value with a specified threshold value, the detection rate of the base stations which allow the mobile radio terminal to be in a standby state is reduced.

The present invention is made in view of the above circumstances, and has an object to provide a mobile radio terminal and a base station search method which reduce power consumption in the case of searching for a base station, and can preferably prevent reduction in a detection rate of the base station in the case of searching for a base station.

In order to attain the above-mentioned circumstances, a mobile radio terminal according to an aspect of the present invention is characterized by comprising a communicating unit configured to perform radio communication with a base station belonging to a mobile communication network, a measuring unit configured to measure an electric field strength of a radio signal received by the communicating unit from a base station belonging to the mobile communication network, a first search unit configured to search for the base station by using a frequency at which the electric field strength of the radio signal measured by the measuring unit has a reference value or more out of a frequency group usable for communication with the base station belonging to the mobile communication network by the communicating unit, a second search unit configured to search for the base station by using the frequency group usable for communication with the base station belonging to the mobile communication network by the communicating unit, and a search control unit configured to perform control so as to search for the base station by the first search unit until a number of searches for the base station by the first search unit corresponds to an upper limit value of a number of searches previously set or stored, and to search for the base station by the second search unit if the base station search by the first search unit does not succeed by a time when the number of searches for the base station by the first search unit corresponds to the upper limit value previously set or stored.

In order to attain the above-mentioned circumstances, a base station search method according to another aspect of the present invention is characterized by comprising a communication step of performing radio communication with a base station belonging to a mobile communication network, a measurement step of measuring an electric field strength of a radio signal received from the base station belonging to the mobile communication network by a process of the communication step, a first search step of searching for the base station by using a frequency at which the electric field strength of the radio signal measured by a process of the measurement step has a reference value or more out of a frequency group usable for communication with the base station belonging to the mobile communication network by the process of the communication step, a second search step of searching for the base station by using the frequency group usable for communication with the base station belonging to the mobile communication network by the process of the communication step, and a search control step of performing control so as to search for the base station by a process of the first search step until a number of searches for the base station by the process of the first search step corresponds to an upper limit value of a number of searches previously set or stored, and to search for the base station by a process of the second search step if the base station search by the process of the first search step does not succeed by a time when the number of searches for the base station by the process of the first search step corresponds to the upper limit value previously set or stored.

In order to attain the above-mentioned circumstances, a base station search method according to another aspect of the present invention is, in a base station search method of a mobile radio terminal comprising a communicating unit that performs radio communication with a base station belonging to a mobile communication network, and a measuring unit that measures an electric field strength of a radio signal received by the communicating unit from the base station belonging to the mobile communication network, characterized by comprising a first search step of searching for the base station by using a frequency at which the electric field strength of the radio signal measured by the measuring unit has a reference value or more out of a frequency group usable for communication with the base station belonging to the mobile communication network by the communicating unit, a second search step of searching for the base station by using the frequency group usable for communication with the base station belonging to the mobile communication network by the communicating unit, and a search control step of performing control so as to search for the base station by a process of the first search step until a number of searches for the base station by the process of the first search step corresponds to an upper limit value of a number of searches previously set or stored, and to search for the base station by a process of the second search step if the base station search by the process of the first search step does not succeed by a time when the number of searches for the base station by the process of the first search step corresponds to the upper limit value previously set or stored.

In order to attain the above-mentioned circumstances, a mobile radio terminal according to another aspect of the present invention is characterized by comprising a communicating unit that performs radio communication with a base station belonging to a mobile communication network, a measuring unit that measures an electric field strength of a radio signal received by the communicating unit from the base station belonging to the mobile communication network, a first search unit that searches for the base station by using a frequency at which the electric field strength of the radio signal measured by the measuring unit has a reference value or more out of a frequency group usable for communication with the base station belonging to the mobile communication network by the communicating unit, a second search unit that searches for the base station by using the frequency group usable for communication with the base station belonging to the mobile communication network by the communicating unit, and a search control unit that performs control so as to search for the base station by the first search unit until a search time for the base station by the first search unit corresponds to an upper limit value of a search time previously set or stored, and to search for the base station by the second search unit when the base station search by the first search unit does not succeed by a time when the search time for the base station by the first search unit corresponds to the upper limit value previously set or stored.

DETAILED DESCRIPTION OF THE INVENTION

Figure 1:
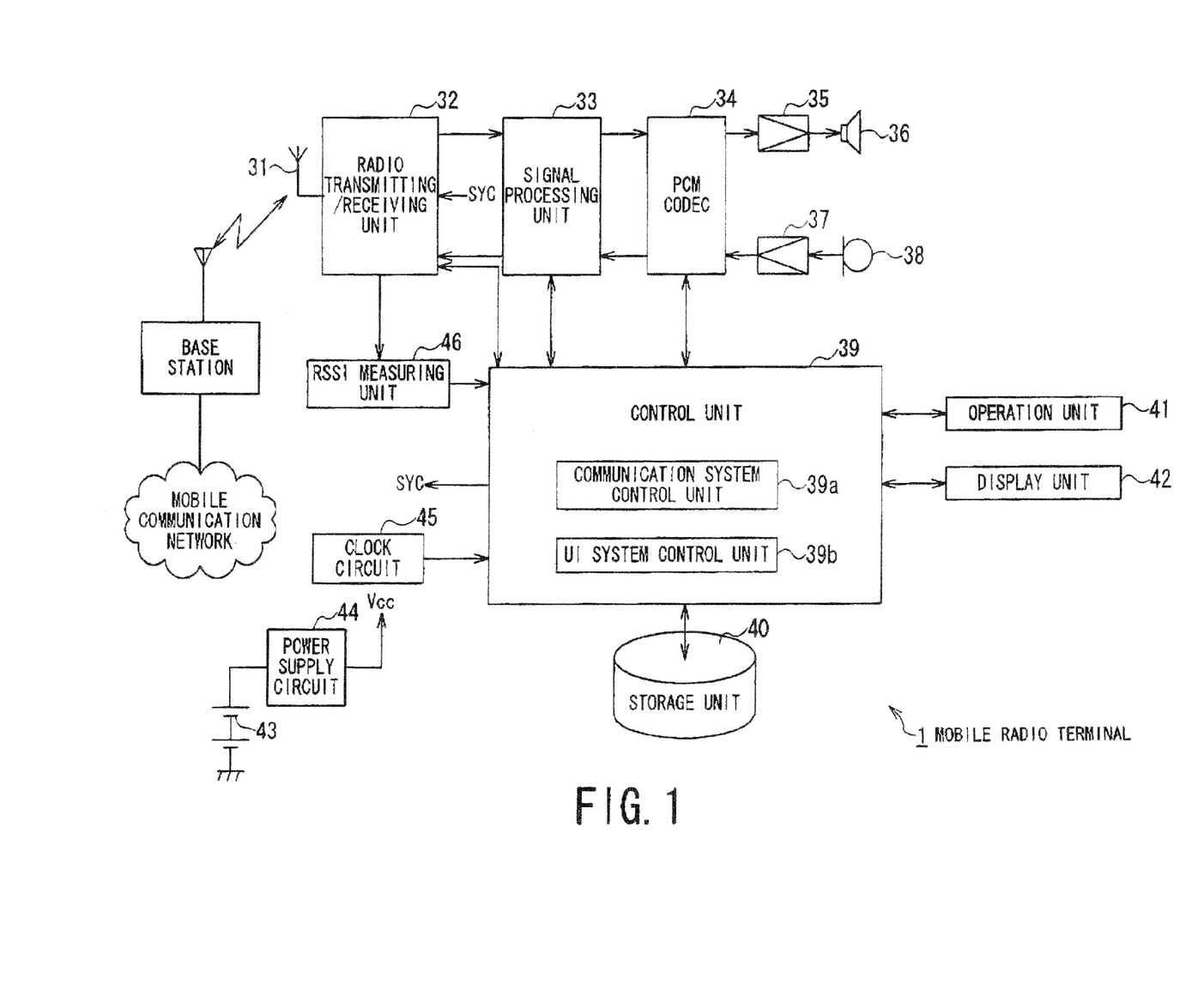
FIG. 1 is a block diagram showing an internal configuration of a mobile radio terminal according to the present invention.

Hereinafter, an embodiment of the present invention will be described with reference to the drawings. FIG. 1 shows an internal configuration of a mobile radio terminal 1 according to the present invention. The mobile radio terminal 1 includes an antenna 31, a radio transmitting/receiving unit 32, a signal processing unit 33, a PCM codec 34, a reception amplifier 35, a speaker 36, a transmission amplifier 37, a microphone 38, a control unit 39, a storage unit 40, an operation unit 41, a display unit 42, a battery 43, a power supply circuit 44 and a clock circuit 45.

The mobile radio terminal 1 can perform voice communication and data communication by not only the W-CDMA method, but also any radio communication method of a GSM method, a cdma2000 m1×RTT method, an EVDO method and an E-UTRA method that is a radio access of LTE system clarified as $3.9^{th}$ generation of mobile communication system, and the antenna 31, the radio transmitting/receiving unit 32 and the signal processing unit 33 correspond to these methods.

The antenna 31 receives, from a space, radio signals which are transmitted by various communication processing systems from a base station BS accommodated in a mobile communication network NW. The antenna 31 irradiates a radio signal of any one of the access methods to a space so as to be able to perform radio communication by various communication processing systems. The mobile communication network NW and the base station BS are components of a part of the mobile communication system. In the case of FIG. 1, only one base station BS is clearly shown for simplification of the description, but in reality, a number of base stations BS are accommodated in the mobile communication network NW. In the mobile communication system, a number of radio zones are formed. At least one base station BS is disposed in each of the radio zones. The base station BS performs radio communication with the mobile radio terminal 1 at a frequency which is previously assigned to the base station BS.

The radio transmitting/receiving unit 32 performs radio communication with the base station BS accommodated in the mobile communication network NW through the antenna 31 by various communication processing methods. The radio transmitting/receiving unit 32 generates a radio signal at a carrier frequency instructed by the control unit 39 based on a modulation signal generated in the signal processing unit 33. Further, the radio transmitting/receiving unit 32 receives the radio signal at the carrier frequency instructed by the control unit 39, and mixes the radio signal with a local oscillation signal outputted from a frequency synthesizer to frequency-convert (down-convert) the signal into an intermediate frequency signal. The radio transmitting/receiving unit 32 orthogonally demodulates the down-converted intermediate frequency signal and outputs a reception base band signal. The reception result is outputted to the signal processing unit 33 and the control unit 39.

The signal processing unit 33 is configured by a DSP (Digital Signal Processor). The signal processing unit 33 applies predetermined signal processing to the reception base band signal, and obtains reception packet data in a predetermined transmission format. The signal processing unit 33 demodulates an audio signal included in the received packet data, decodes the demodulated result and obtains audio data. On the other hand, the signal processing unit 33 codes a transmission audio signal, generates a modulation signal based on the audio data and the other data obtained by coding, and outputs the generated modulation signal to the radio transmitting/receiving unit 32.

The control unit 39 has a CPU (Central Processing Unit), a ROM (Read Only Memory) and a RAM (Random Access Memory) and the like. The CPU executes various processes according to a program stored in the ROM, or various application programs including an operating system (OS) and control programs loaded to the RAM from the storage unit 40, and generates various control signals and supplies the control signals to each of the units, thereby performing centralized control of the mobile radio terminal 1. In concrete, the control unit 39 includes a control function of realizing audio (sound) communication and data communication by various communication processing systems, controls a carrier frequency used by the radio transmitting/receiving unit 32, and establishes synchronization with the radio frame transmitted from the base station based on the reception result in the radio transmitting/receiving unit 32. The RAM properly stores the data and the like required when the CPU executes various kinds of processes.

The control unit 39 includes one or a plurality of CPUs in accordance with necessity. In the embodiment of the present invention, an example including two CPUs is shown. But the present invention is not limited to this, and control may be performed so as to be carried out by one CPU, or may be carried out by three CPUs or more. A communication system control unit 39a includes a communication processing CPU, and performs control used in a communication process. The communication system control unit 39a controls a communication process using the antenna 31, the radio transmitting/receiving unit 32, the signal processing unit 33, the PCM codec 34, the reception amplifier 35, the transmission amplifier 37 and the like. A UI system control unit 39b includes a UI processing CPU, and performs control concerning a UI process using the storage unit 40, the operation unit 41, the display unit 42, the clock circuit 45 and the like.

The storage unit 40 has a flash memory device that is a nonvolatile memory which is electrically rewritable and erasable, or an HDD (Hard Disc Drive), and stores various application programs executed by the CPU of the control unit 39, various data groups, the control program and the control data of the mobile radio terminal 1, and the identification information assigned peculiarly to the mobile radio terminal 1 or a user. In addition to this, the storage unit 40 properly stores the telephone book data which associates names with telephone numbers, the data acquired by data communication and downloaded data. The power supply circuit 44 generates a predetermined operation power supply voltage Vcc based on the output of the battery 43 and supplies the operation power supply voltage Vcc to the respective circuit units. The mobile radio terminal 1 is provided with the clock circuit (timer) 45 which measures the present time.

The mobile radio terminal 1 includes the reception amplifier 35, the speaker 36 which amplifies and outputs a reception audio signal, the transmission amplifier 37, the microphone 38 which receives a transmission audio signal, the operation unit 41 which accepts the request from the user, and the display unit 42 which displays an image based on received data.

An RSSI measuring unit 46 measures the electric field strength of the signal received by the radio transmitting/receiving unit 32 from the base station BS, and outputs the information with respect to the RSSI value of the measured reception signal to the control unit 39.

The mobile radio terminal 1 according to the present embodiment carries out base station search if the mobile radio terminal 1 is in an out of service area by using a first base station search method for searching for a base station by using the frequencies which pass cutoff point determination as a target after cutoff point determination is performed for the frequencies to be the target of the base station search with use of an RSSI value of a reception signal measured by the RSSI measuring unit 46, and a second base station search method for searching for the base station by using all frequencies as the target without performing the cutoff point determination process based on the RSSI value of the reception signal measured by the RSSI measuring unit 46. In the cut off point determination process, the mobile radio terminal 1 determines whether the RSSI value of the reception signal is a specified threshold value or more (a reference value). More specifically, the mobile radio terminal 1 according to the present embodiment searches for the base station at predetermined search intervals by using the first base station search method, and searches for the base station by using the second base station search method instead of the first base station search method, at the ratio of once in several times, for example. If the mobile radio terminal 1 according to the present embodiment does not succeed in search for the base station which allows the mobile radio terminal 1 to be in a standby state even when the mobile radio terminal 1 searches for the base station by using the second base station search method, the mobile radio terminal 1 sets a period until the base station search using the second base station search method is carried out to a period longer than the previous period, and carries out the base station search in the out of service area. Meanwhile, if the mobile radio terminal 1 according to the present embodiment searches for the base station by using the second base station search method, and succeeds in search for the base station which allows the mobile radio terminal 1 to be in a standby state, the mobile radio terminal 1 sets the period until the base station search using the second base station search method is carried out to be a period shorter than the previous period, and carries out the base station search in the out of service area. As a result, by extending the period of using the second base station search method for searching for the base station without using the cutoff point determination process by the RSSI measuring unit 46 with large power consumption, power consumption in the case of searching for the base station is reduced, and reduction in the detection rate of the base station at the time of base station search can be favorably prevented, so that the time until the mobile radio terminal 1 returns to an within-cell range (within service area) can be shortened. Hereinafter, the base station search method in an out of service area by using this method will be described.

Figure 2:
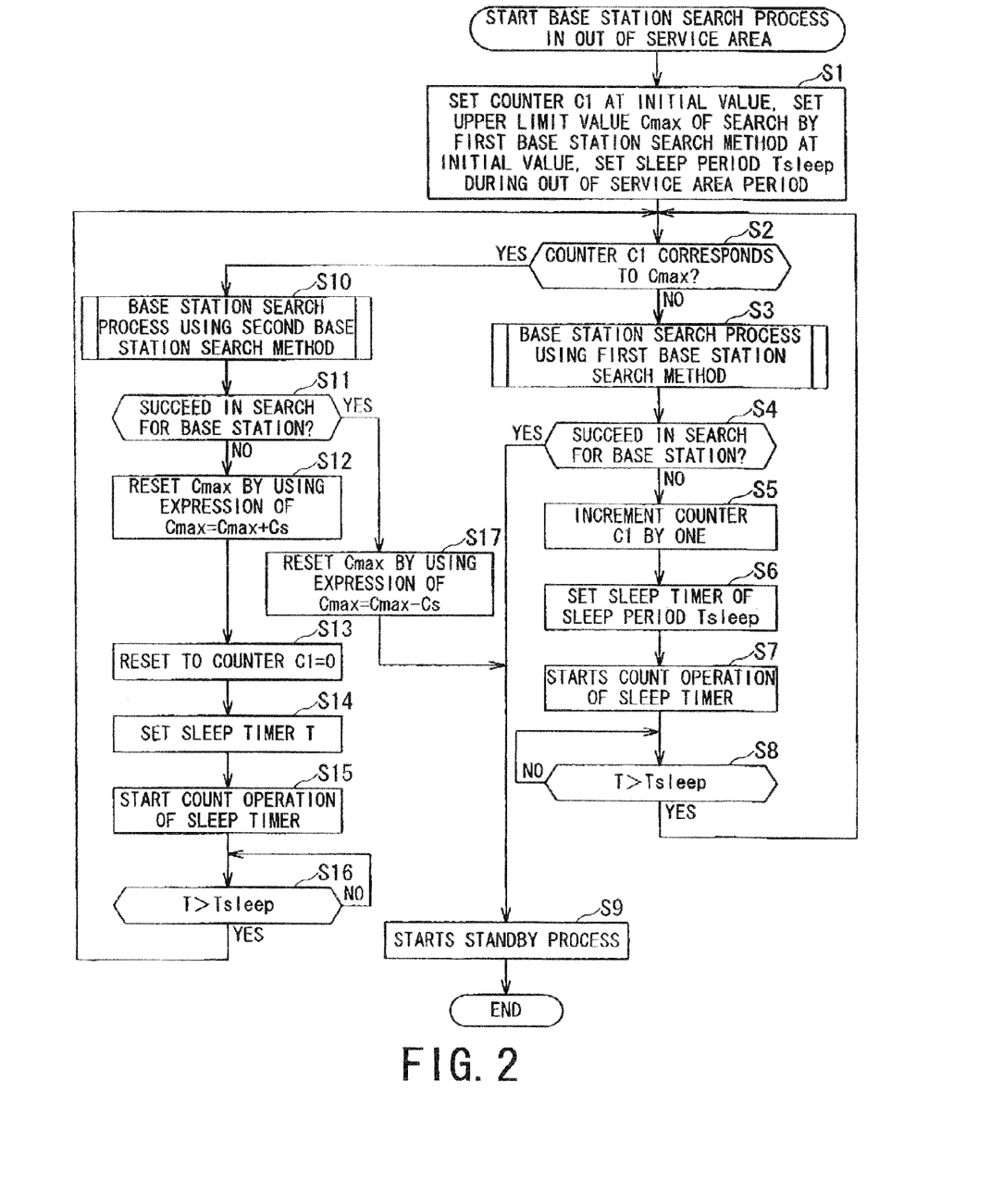
FIG. 2 is a flowchart explaining a base station search process in an out of service area in the mobile radio terminal of FIG. 1.

With reference to a flowchart of FIG. 2, the base station search process in an out of service area in the mobile radio terminal 1 of FIG. 1 will he described. In the case of FIG. 2, when the mobile radio terminal 1 cannot keep synchronism with the radio frame transmitted from the base station, in the case where the mobile radio terminal 1 is in an within-cell range (within service area) state and carries out a standby process, and not a single base station in which the mobile radio terminal 1 can be standby is found, whereby the mobile radio terminal 1 transitions into an out of service area state, the mobile radio terminal 1 may carry out a base station search process (out of service area process) in an out of service area.

Figure 3:
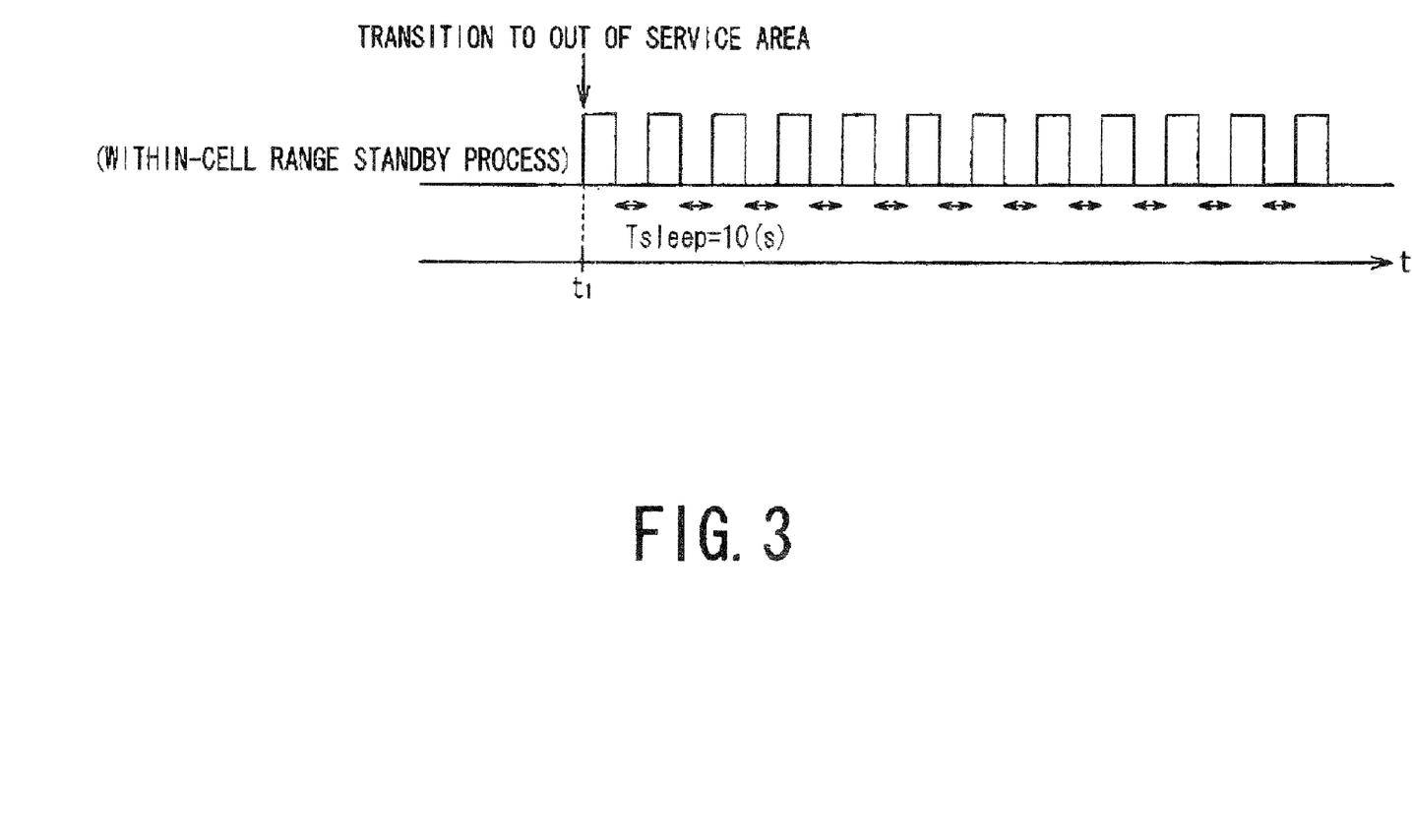
FIG. 3 is a timing chart of base station search in the case of carrying out the base station search process in the out of service area after the mobile radio terminal transitions into an out of service area state.

In step S1, the communication system control unit 39a sets a counter C1 which counts up the number of searches for the base station by the first base station search method to an initial value, and an upper limit value Cmax of the number of searches by the first base station search method to an initial value. In concrete, the communication system control unit 39a sets, for example, the counter C1 to an initial value 0, and sets the upper limit value Cmax of the number of searches by the first base station search method to an initial value 2. The communication system control unit 39a also sets a sleep period Tsleep in which the communication system control unit 39a sleeps during an out of service area period in which the mobile radio terminal 1 is in an out of service area state. In concrete, the communication system control unit 39a sets the sleep period Tsleep to 10(s). The sleep period Tsleep means the period until the next base station search process is started after the base station search process by any one of the first base station search method and the second base station search method ends. FIG. 3 is a timing chart of the base station search in the case where the mobile radio terminal 1 carries out the base station search process in an out of service area after the mobile radio terminal 1 transitions into the out of service area state. As shown in FIG. 3, if the sleep period Tsleep is set at 10(s), after ten seconds elapses after the end of the base station search process by any one of the first base station search method and the second base station search method, the communication system control unit 39a starts the next base station search process by using any one of the first base station search method and the second base station search method.

As will be described later, when the RAM of the control unit 39 or the storage unit 40 already stores the value of Cmax, the mobile radio terminal 1 uses the value of Cmax which is already stored in the RAM of the control unit 39 or the storage unit 40 in the setting process of step S1, instead of setting the value of Cmax to the initial value. As a matter of course, when the mobile radio terminal 1 carries out the base station search process in an out of service area after transitioning into the out of service area state, the mobile radio terminal 1 may indiscriminately set the value of Cmax to the initial value in the setting process of step S1.

In step S2, the communication system control unit 39a determines whether or not the value of the counter C1 corresponds to the upper limit value Cmax of the number of searches by the first base station search method. At a time point when the mobile radio terminal 1 starts the base station search process in the out of service area, the value of the counter C1 is less than the upper limit value Cmax of the number of searches by the first base station search method, and therefore, the communication system control unit 39a determines that the value of the counter C1 does not correspond to the upper limit value Cmax of the number of searches by the first base station search method.

If the communication system control unit 39a determines that the value of the counter C1 does not correspond to the upper limit value Cmax of the number of searches by the first base station search method in step S2, the communication system control unit 39a searches for the base station by using the first base station search method in step S3. The details of the base station search process using the first base station search method are shown in a flowchart of FIG. 4.

With reference to the flowchart of FIG. 4, the details of the base station search process by using the first base station search method in the mobile radio terminal 1 of FIG. 1 will be described. In step S31, the communication system control unit 39a sequentially assigns the carrier frequencies previously stored in the storage unit 40 to the radio transmitting/receiving unit 32, and causes the radio transmitting/receiving unit 32 to receive the signals having the carrier frequencies which are previously stored in the storage unit 40 in sequence. The radio transmitting/receiving unit 32 sequentially receives the signals having the carrier frequencies which are previously stored in the storage unit 40, and outputs the received signals to the RSSI measuring unit 46. The RSSI measuring unit 46 measures the RSSI value concerning the received signal at each of the frequencies from the radio transmitting/receiving unit 32, and outputs the information concerning the measured RSSI value to the communication system control unit 39a. In the case where the storage unit 40 does not previously store the carrier frequencies, the mobile radio terminal 1 measures the RSSI values concerning the received signals at the frequencies existing in a predetermined frequency band.

In step S32, the communication system control unit 39a determines whether or not the frequency having the RSSI value equal to or larger than the reference value is present, based on the RSSI values of the received signals measured by the RSSI measuring unit 46. If the communication system control unit 39a determines that the frequency having the RSSI value equal to or larger than the reference value is present in step S32, the communication system control unit 39a selects the frequency of the search target from the frequency group having the RSSI value equal to or larger than the reference value in step S33. In step S34, the communication system control unit 39a controls the radio transmitting/receiving unit 32, and tries synchronization with the radio frame transmitted from the base station at the frequency selected by the communication system control unit 39a. In step S35, the communication system control unit 39a determines whether or not the communication system control unit 39a succeeds in synchronization with the radio frame transmitted from the base station at the frequency selected by the communication system control unit 39a. If the communication system control unit 39a determines that the communication system control unit 39a succeeds in synchronization with the radio frame transmitted from the base station in step S35, the process returns to FIG. 2.

Meanwhile, if the communication system control unit 39a determines that the communication system control unit 39a cannot acquire synchronization with the radio frame transmitted from the base station in step S35, the communication system control unit 39a determines whether or not search is performed for all the frequencies in step S36. If the communication system control unit 39a determines that search is not performed for all the frequencies in step S36, the process returns to step S33, and the communication system control unit 39a selects the other frequencies from the frequency group having the RSSI value which is the reference value or more. Thereby, the communication system control unit 39a can execute the base station search process by using the frequency group having the RSSI value which is the reference value or more until the communication system control unit 39a can establish synchronization with the radio frame transmitted from the base station relating to any frequency included in the frequency group having the RSSI value which is the reference value or more.

If the communication system control unit 39a determines that the frequency having the RSSI value which is the reference value or more is not present in step S32, the process returns to FIG. 2.

In step S4 of FIG. 2, the communication system control unit 39a determines whether or not it succeeds in the search for the base station by the process of step S3. More specifically, the communication system control unit 39a determines whether or not the communication system control unit 39a can establish synchronization with the radio frame transmitted from the base station relating to any frequency included the frequency group having the RSSI value which is the reference value or more. If the communication system control unit 39a determines that the communication system control unit 39a succeeds in the search of the base station in step S4, the process proceeds to step S9, and the communication system control unit 39a starts a standby process in step S9. More specifically, the communication system control unit 39a designates the frequency at the time of being able to establish synchronization with the radio frame transmitted from the base station to the radio transmitting/receiving unit 32, and causes the radio transmitting/receiving unit 32 to receive notification information. Subsequently, the communication system control unit 39a starts the position registration of the mobile radio terminal 1 based on the received notification information. If the position registration is completed, the mobile radio terminal 1 transits into a standby state.

Figure 5:
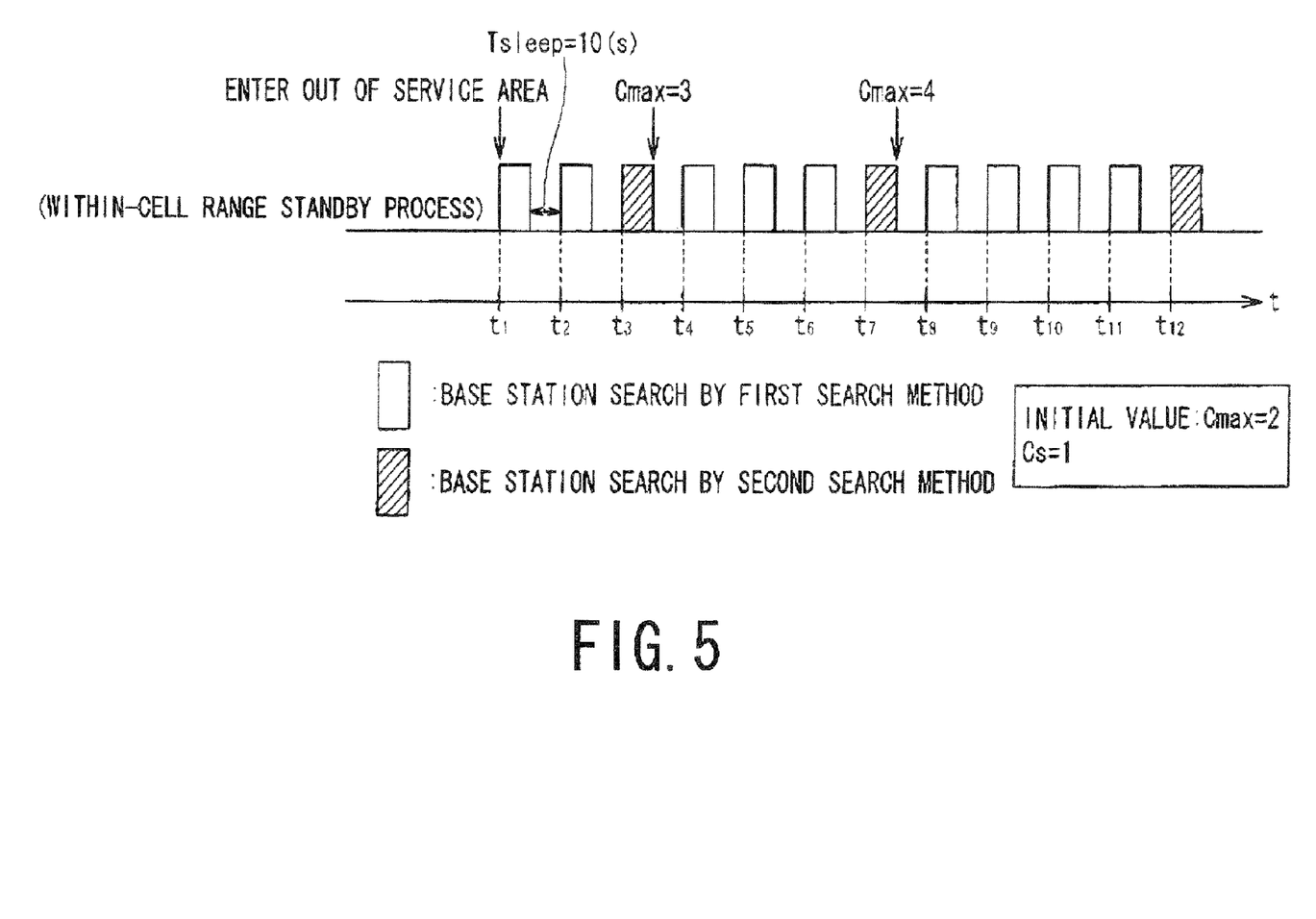
FIG. 5 is a timing chart of the base station search in the case where the mobile radio terminal remains in the out of service area state.

Meanwhile, if the communication system control unit 39a determines that the communication system control unit 39a fails in the search for the base station in step S4, the communication system control unit 39a increments the counter C1 by one. For example, if the mobile radio terminal 1 executes search for the base station once by using the first base station search method in step S3, the counter C1 is incremented by one from the initial value of zero, and the value of the counter C1 is updated to one. In step S6, the communication system control unit 39a sets the sleep timer of the sleep period Tsleep, in which the communication system control unit 39a sleeps during the out-of-cell period (out of service area period) in which the mobile radio terminal 1 is in the out of service area state, to the clock circuit 45. In step S7, the clock circuit 45 starts the count operation of the sleep timer of the set sleep period Tsleep. At this time, the communication system control unit 39a sleeps until the sleep timer of the sleep period Tsleep expires. In step S8, the clock circuit 45 performs a count operation until the sleep timer of the sleep period Tsleep expires. If the clock circuit 45 counts until the sleep timer of the sleep period Tsleep expires in step S8, the process proceeds to step S2, and the communication system control unit 39a wakes up and executes the processes of step S2 and the following steps. Thereby, the communication system control unit 39a executes the base station search process by the first base station search method until the value of the counter C1 corresponds to the upper limit value Cmax of the number of searches by the first base station search method. FIG. 5 is a timing chart of the base station search in the case where the mobile radio terminal 1 remains in the out of service area state. As shown in FIG. 5, the communication system control unit 39a starts the first search for the base station using the first base station search method at a time $t_1$, and starts the second search for the base station using the first base station search method at a time $t_2$. If the second search for the base station using the first base station search method ends, the value of the counter C1 is incremented, and the value of the counter C1 becomes "2". More specifically, if the upper limit value Cmax of the number of searches by the first base station search method is set at "2", the value of the counter C1 corresponds to the upper limit value Cmax of the number of searches by the first base station search method (C1=Cmax).

If the communication system control unit 39a determines that the value of the counter C1 corresponds to the upper limit value Cmax of the number of searches by the first base station search method in step S2, the communication system control unit 39a searches for the base station by using the second base station search method in step S10. In the case of FIG. 5, the communication system control unit 39a starts search for the base station using the second base station search method at a time t3. The details of the base station search process using the second base station search method are shown in a flowchart of FIG. 6.

Figure 6:
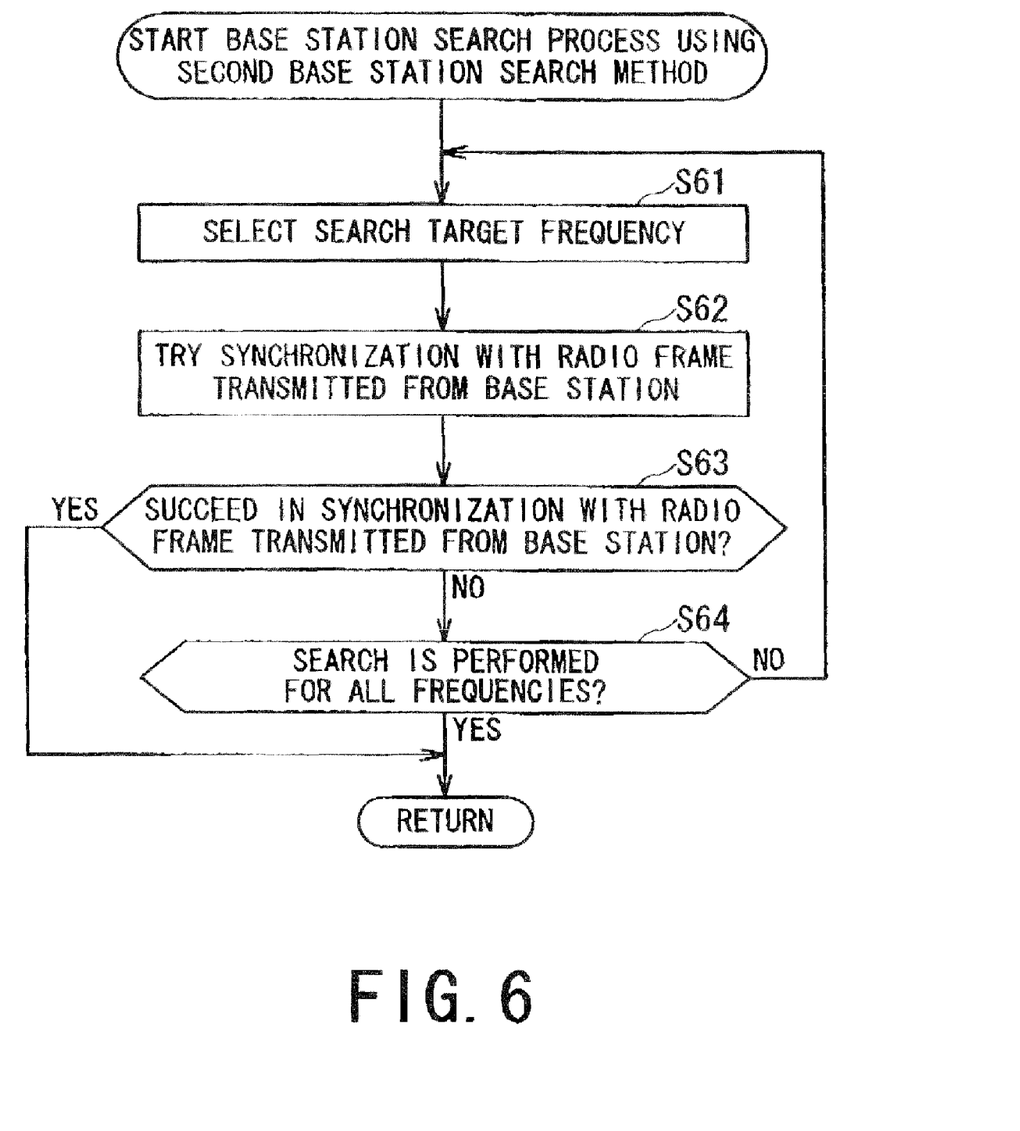
FIG. 6 is a flowchart explaining a base station search process using a second base station search method in the mobile radio terminal of FIG. 1.

With reference to the flowchart of FIG. 6, the details of the base station search process using the second base station search method in the mobile radio terminal 1 of FIG. 1 will be described. In step S61, the communication system control unit 39a selects the frequency of the search target from the carrier frequency group previously stored in the storage unit 40. In step S62, the communication system control unit 39a assigns the frequency selected by the communication system control unit 39a to the radio transmitting/receiving unit 32, and causes the radio transmitting/receiving unit 32 to receive the signal having the carrier frequency previously stored in the storage unit 40. The communication system control unit 39a controls the radio transmitting/receiving unit 32, and tries synchronization with the radio frame transmitted from the base station at the frequency selected by the communication system control unit 39a. In step S63, the communication system control unit 39a determines whether or not synchronization with the radio frame transmitted from the base station can be established at the frequency selected by the communication system control unit 39a, via the radio transmitting/receiving unit 32. If the communication system control unit 39a determines that the communication system control unit 39a can establish synchronization with the radio frame transmitted from the base station in step S63, the process returns to FIG. 2.

Meanwhile, if the communication system control unit 39a determines that the communication system control unit 39a cannot establish synchronization with the radio frame transmitted from the base station in step S63, the communication system control unit 39a determines whether or not search is performed for all the frequencies in step S64. If the communication system control unit 39a determines that the search is not performed for all the frequencies in step S64, the process returns to step S61, arid the communication system control unit 39a selects other search target frequencies from the carrier frequency group previously stored in the storage unit 40. Thereby, the communication system control unit 39a can execute the base station search process until synchronization with the radio frame transmitted from the base station relating to any frequency included in the carrier frequency group previously stored in the storage unit 40 can be established.

In step S11 of FIG. 2, the communication system control unit 39a determines whether or not the communication system control unit 39a succeeds in the search for the base station by the process of step S10. More specifically, the communication system control unit 39a determines whether or not the pilot signal relating to any frequency included in the carrier frequency group previously stored in the storage unit 40 is detected. If the communication system control unit 39a determines that the communication system control unit 39a fails in the search of the base station in step S11, the communication system control unit 39a sets the value which is the result of adding Cs to the present Cmax stored in the RAM of the control unit 39 or the storage unit 40 as the value of a new Cmax in order to set the period until the base station search using the second base station search method is carried out to be a period longer than the previous period. For example, when the present Cmax which is stored in the RAM of the control unit 39 or the storage unit 40 is the initial value "2" of Cmax set in step S1, the new Cmax is set to a value "3" which is the result of adding the value "1" of Cs to the initial value "2" of Cmax, as shown in FIG. 5. The communication system control unit 39a causes the RAM or the storage unit 40 to store the set value of the new Cmax. The mobile radio terminal 1 according to the present embodiment may change the value of Cs to be added to the present Cmax stored in the RAM of the control unit 39 or the storage unit 40 in accordance with the number of times (the number of failures) of the base station search process using the second base station search method when failing in the search for the base station using the second base station search method. More specifically, when the number of times (the number of failures) of the base station search process using the second base station search method is one, the value of Cs to be added to the present Cmax stored in the RAM of the control unit 39 or the storage unit 40 may be set as "1"; when the number of times (the number of failures) of the base station search process using the second base station search method is two, the value of Cs may be set as "3", and when the number of times (the number of failures) of the base station search process using the second base station search method is three, the value of Cs may be set as "5". Thereby, with consideration given to the increase in power consumption due to use of the second base station search method, the base station search in the out of service area can be carried out while the period until the base station search using the second base station search method is carried out is set to be a period longer than the previous period in accordance with the number of times of the base station search process using the second base station search method.

In step S13, the communication system control unit 39a resets the counter C1 to the initial value "0". In step S14, the communication system control unit 39a sets the sleep timer of the sleep period Tsleep in which the communication system control unit 39a sleeps during the out of service area period in which the mobile radio terminal 1 is in an out of service area state to the clock circuit 45. In step S15, the clock circuit 45 starts a count operation of the sleep timer of the set sleep period Tsleep. At this time, the communication system control unit 39a sleeps until the sleep timer of the sleep period Tsleep expires. In step S16, the clock circuit 45 performs a count operation until the sleep timer of the sleep period Tsleep expires. If the clock circuit 45 counts until the sleep timer of the sleep period Tsleep expires in step S16, the process proceeds to step S2, and the communication system control unit 39a wakes up and executes the processes of step S2 and the following steps. Thereby, the communication system control unit 39a can execute the base station search process by the first base station search method until the value of the counter C1 which is reset to the initial value "0" corresponds to the new Cmax. In concrete, if the situation is assumed, in which any search for the base station does not succeed, the communication system control unit 39a starts the first search for the base station using the first base station search method at a time $t_4$ after the reset of C1, starts the second search for the base station using the first base station search method at a time $t_5$, and further starts the third search for the base station using the first base station search method at a time $t_6$. If the third search for the base station using the first base station search method ends, the value of the counter C1 is incremented, and the value of the counter C1 becomes "3". Thereafter, the communication system control unit 39a starts search for the base station using the second base station search method at a time $t_7$. The communication system control unit 39a sets a new Cmax to the value "4" which is the result of adding the value "1" of Cs to the value "3" of the present Cmax in step S12. Next, the communication system control unit 39a starts the first search for the base station using the first base station search method at a time $t_8$ after the reset of C1, starts the second search for the base station using the first base station search method at a time $t_9$, starts the third base station search using the first base station search method at a time $t_{10}$, and starts the fourth search for the base station using the first base station search method at a time $t_{11}$.

As above, when the mobile radio terminal 1 according to the present embodiment cannot search for the base station by the first base station search method using the cutoff point determining process by the RSSI measuring unit 46, the mobile radio terminal 1 considers increase in power consumption due to use of the second base station search method, and can carry out the base station search in an out of service area while setting the period until the base station search using the second base station search method is carried out to be a period longer than the previous period. As a result, the mobile radio terminal 1 according to the present embodiment can detect the frequency which cannot be detected by the first base station search method, and can prevent reduction in the detection rate of the base station while decreasing the frequency of carrying out the second base station search method.

Meanwhile, if the communication system control unit 39a determines that the communication system control unit 39a succeeds in the search for the base station in step S11, the process proceeds to step S17, and in order to set the period until the base station search using the second base station search method is carried out to be a period shorter than the previous period, the communication system control unit 39a sets the value which is the result of subtracting Cs from the present Cmax stored in the RAM of the control unit 39 or the storage unit 40 as the value of a new Cmax in step S17. For example, when the present Cmax stored in the RAM of the control unit 39 or the storage unit 40 is the initial value "2" of Cmax which is set in step S1, the new Cmax is set to the value "1" which is the result of subtracting the value "1" of Cs from the initial value "2" of Cmax. The communication system control unit 39a causes the RAM or the storage unit 40 to store the set value of the new Cmax. The process proceeds to step S9, and the communication system control unit 39a starts a standby process in step S9.

Figure 7:
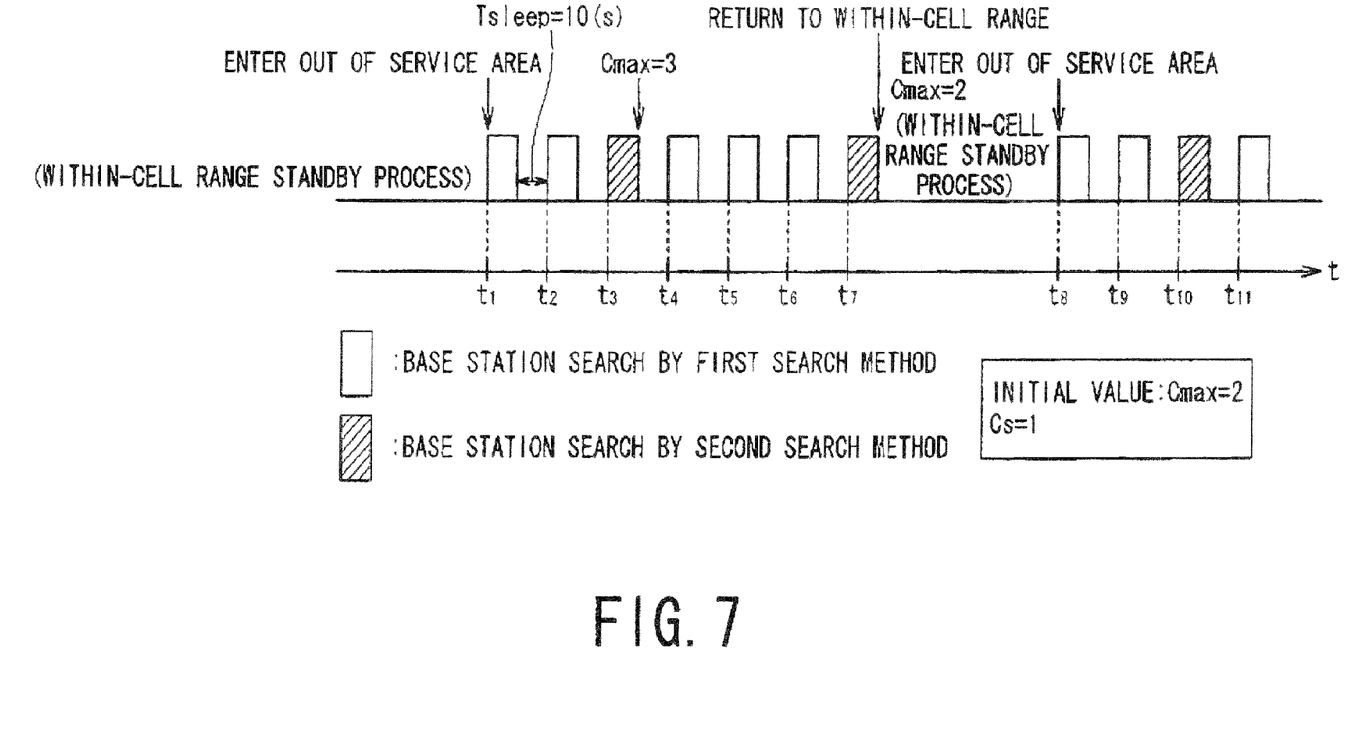
FIG. 7 is a timing chart of the base station search in the case where the mobile radio terminal temporarily returns to an within-cell range (within service area) from the out of service area by the second base station search method.

FIG. 7 is a timing chart of base station search in the case where the mobile radio terminal 1 returns to an within-cell range from an out of service area by the second base station search method. As shown in FIG. 7, the communication system control unit 39a starts the first search for the base station using the first base station search method at the time $t_4$ after the reset of C1, starts the second search for the base station using the first base station search method at the time $t_5$, and further starts the third search for the base station using the first base station search method at the time $t_6$. When the third search for the base station using the first base station search method ends, the value of the counter C1 is incremented, and the value of the counter C1 becomes "3". Thereafter, the communication system control unit 39a starts the search for the base station using the second base station search method at the time $t_7$. If the search for the base station using the second base station search method at the time $t_7$ succeeds, the communication system control unit 39a sets a new Cmax at the value "2" which is the result of subtracting the value "1"

of Cs from the value "3" of the present Cmax. Thereafter, the mobile radio terminal 1 starts a standby process in step S9, and the mobile radio terminal 1 is in a standby state. When the mobile radio terminal 1 transitions to an out of service area, the mobile radio terminal 1 executes the base station search process in the out of service area by using the value "2" of the present Cmax stored in the RAM of the control unit 39 or the storage unit 40.

By extending the period of using the second base station search method for searching for the base station without using the cutoff point determining process by the RSSI measuring unit 46 with large power consumption, the mobile radio terminal 1 according to the present invention reduces power consumption in the case of searching for a base station, can favorably prevent reduction in the detection rate of the base station due to use of only the first base station search method, and can shorten the time until the mobile radio terminal 1 returns to the within-cell range.

Figure 4:
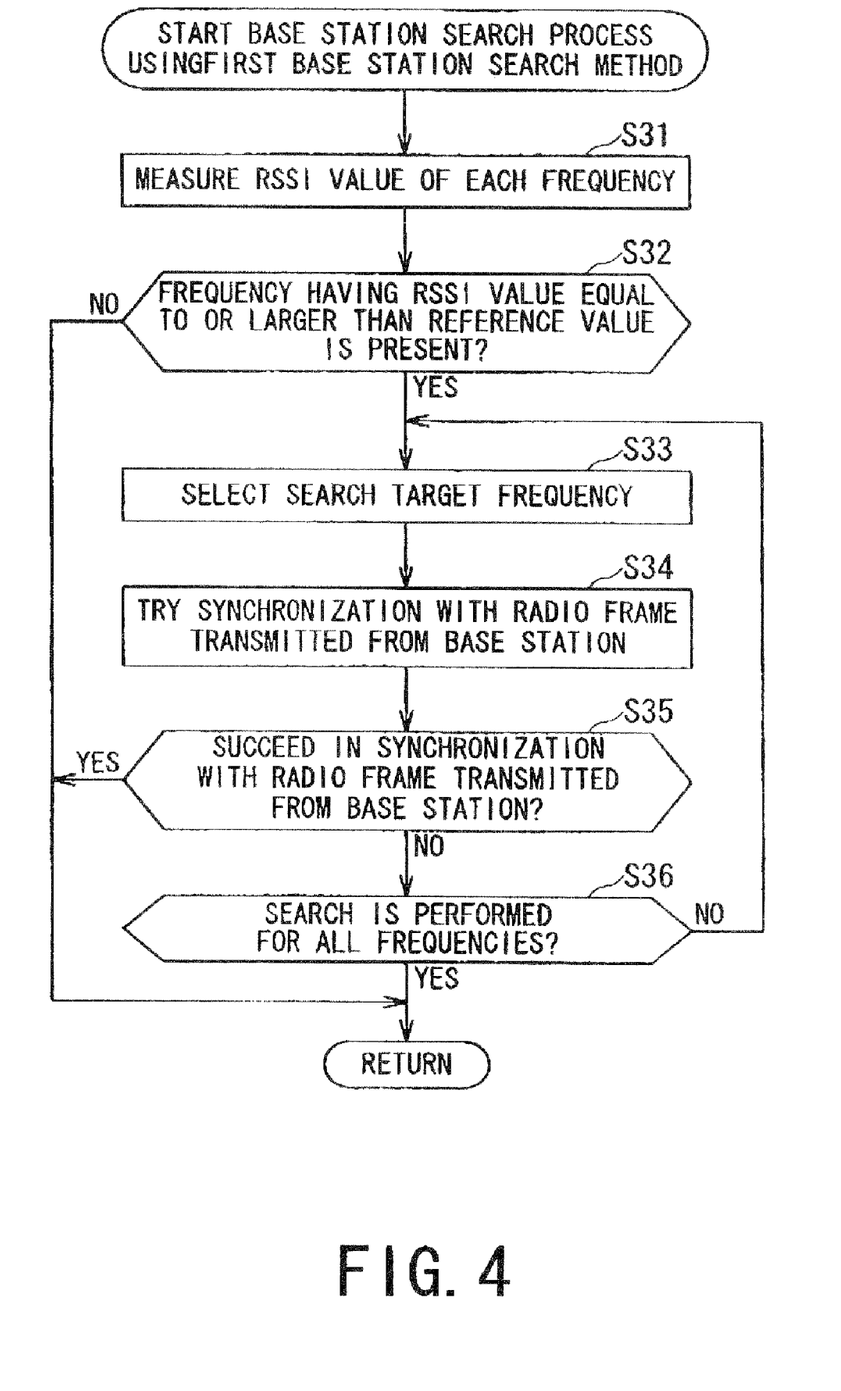
FIG. 4 is a flowchart explaining the details of the base station search process using a first base state search method in the mobile radio terminal of FIG. 1.

In the case of the base station search process using the first base station search method of FIG. 4, signals having the respective carrier frequencies previously stored in the storage unit 40 are sequentially received, the RSSI values of the received signals are measured, and thereafter, the search target frequency is selected from the frequencies having the RSSI values equal to or larger than the reference value. However, the present invention is not limited to such a case, the search target frequency is firstly selected from a plurality of carrier frequencies previously stored in the storage unit 40, after which, the RSSI value of the received signal is measured, and if the frequency has the RSSI value equal to or larger than the reference value, synchronization with the radio frame transmitted from the base station may be tried. The base station search process using the first base station search method in this case is shown in a flowchart of FIG. 8.

Figure 8:
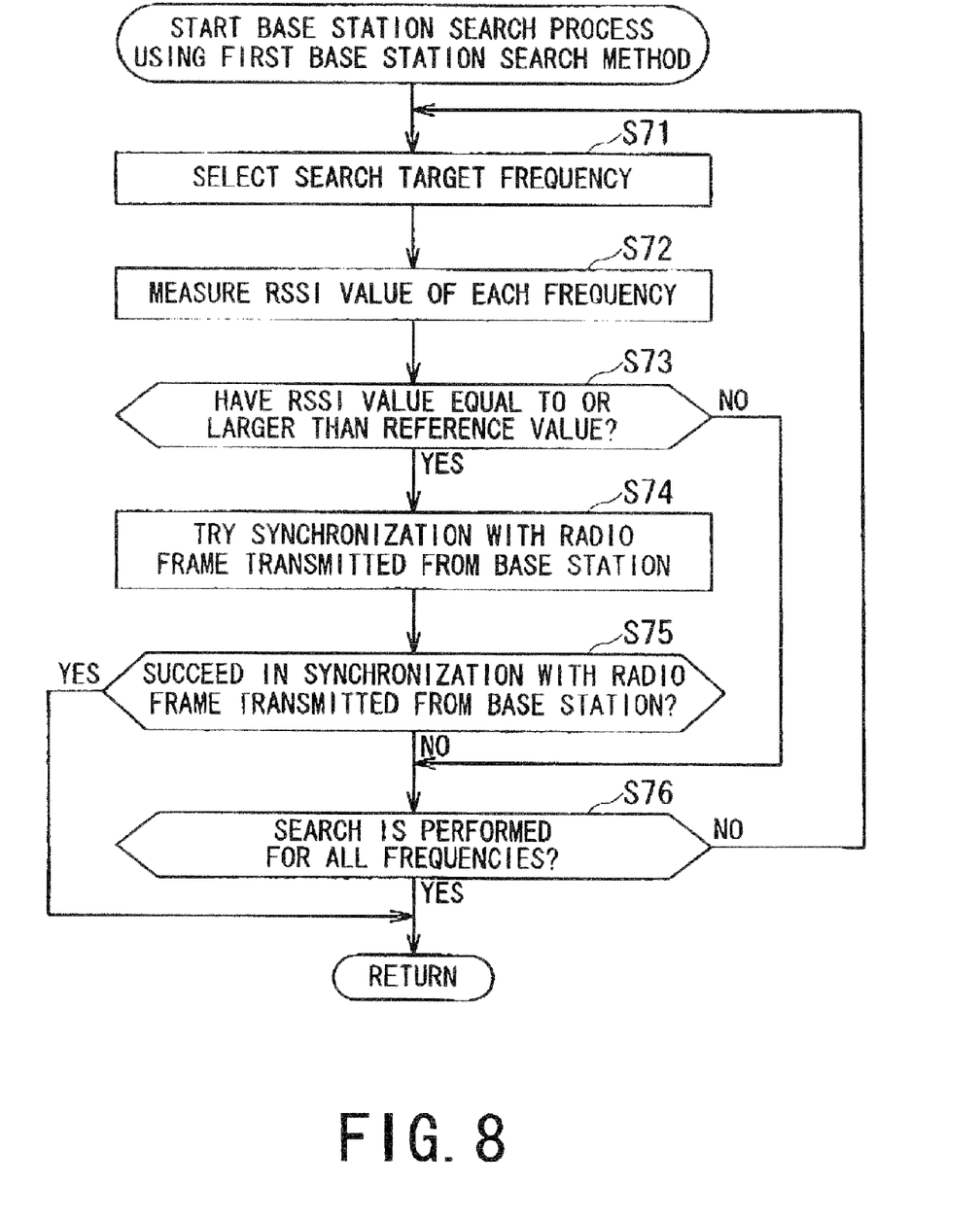
FIG. 8 is a flowchart explaining the details of another base station search process using the first base station search method in the mobile radio terminal of FIG. 1.

With reference to the flowchart of FIG. 8, the details of another base station search process by using the first base station search method in the mobile radio terminal 1 of FIG. 1 will be described. In step S71, the communication system control unit 39a selects search target frequencies from the carrier frequency group previously stored in the storage unit 40. In step S72, the communication system control unit 39a sequentially assigns the frequencies selected as the search target from the carrier frequency group previously stored in the storage unit 40 to the radio transmitting/receiving unit 32, and causes the radio transmitting/receiving unit 32 to receive in sequence the signals having any of the carrier frequencies which are previously stored in the storage unit 40. The radio transmitting/receiving unit 32 receives the signals of the search target frequencies, and outputs the received signals to the RSSI measuring unit 46. The RSSI measuring unit 46 measures the RSSI values concerning the received signals of the search target frequencies from the radio transmitting/receiving unit 32, and outputs the information concerning the RSSI values which are measured to the communication system control unit 39a. In the case where the storage unit 40 does not previously store the carrier frequencies, the mobile radio terminal 1 measures the RSSI values concerning the received signals of the frequencies existing in a predetermined frequency band.

In step S73, the communication system control unit 39a determines whether or not the received signals of the search target frequencies have the RSSI values equal to or larger than the reference value based on the RSSI values of the received signals measured by the RSSI measuring unit 46. If the communication system control unit 39a determines that the received signals have the RSSI values equal to or larger than the reference value in step S73, the communication system control unit 39a controls the radio transmitting/receiving unit 32 and tries synchronization with the radio frame transmitted from the base station at the search target frequencies in step S74. In step S75, the communication system control unit 39a determines whether or not the communication system control unit 39a succeeds in synchronization with the radio frame transmitted from the base station at the search target frequencies via the radio transmitting/receiving unit 32. If the communication system control unit 39a determines that it succeeds in synchronization with the radio frame transmitted from the base station in step S75, the process returns to FIG. 2.

Meanwhile, if the communication system control unit 39a determines that the communication system control unit 39a cannot acquire synchronization with the radio frame transmitted from the base station in step S75, the communication system control unit 39a determines whether or not search is performed for all the frequencies included in the carrier frequency group previously stored in the storage unit 40 in step S76. If the communication system control unit 39a determines that search is not performed for all the frequencies in step S76, the process returns to step S71, and the communication system control unit 39a selects the other frequencies from the carrier frequency group previously stored in the storage unit 40. Thereby, the communication system control unit 39a can execute the base station search process by using the frequency group having the RSSI value equal to or larger than the reference value until it can establish synchronization with the radio frame transmitted from the base station, with respect to any of the frequencies having the RSSI values equal to or larger than the reference value.

If the communication system control unit 39a determines that the received signals do not have the RSSI values equal to or larger than the reference value in step S73, the process proceeds to step S76.

If the present Cmax is equal to or smaller than a predetermined reference value in the reset process of Cmax in step S17 of FIG. 2, it may be made unnecessary for the mobile radio terminal 1 to subtract Cs from the value of the present Cmax. The process in this case is shown in a flowchart of FIG. 9. The process of FIG. 9 is basically the same as the process of FIG. 2, and the description of the redundant part will be omitted since it becomes repetition of the previous description.

If the communication system control unit 39a determines that it succeeds in the search for the base station in step S91, the process proceeds to step S97, and the communication system control unit 39a determines whether or not the present Cmax value stored in the RAM of the control unit 39 or the storage unit 40 is equal to or smaller than the reference value in step S97. If the communication system control unit 39a determines that the present Cmax value is not equal to or smaller than the predetermined reference value in step S97, the process proceeds to step S98, and the communication system control unit 39a performs a reset process of Cmax. Meanwhile, if the communication system control unit 39a determines that the present Cmax value is equal to or smaller than the predetermined reference value in step S97, the process of step S98 is skipped. Thereby, the Cmax value can be prevented from becoming smaller than the predetermined reference value, and increase in power consumption as a result of frequently performing the base station search process using the second base station search method can be prevented.

If the present Cmax is a predetermined reference value or larger in the reset process of Cmax in step S17 of FIG. 2, the mobile radio terminal 1 changes the Cs value which is subtracted from the present Cmax value, and may significantly decrease the present Cmax value, or may optionally change the Cs value according to the present Cmax value.

Figure 9:
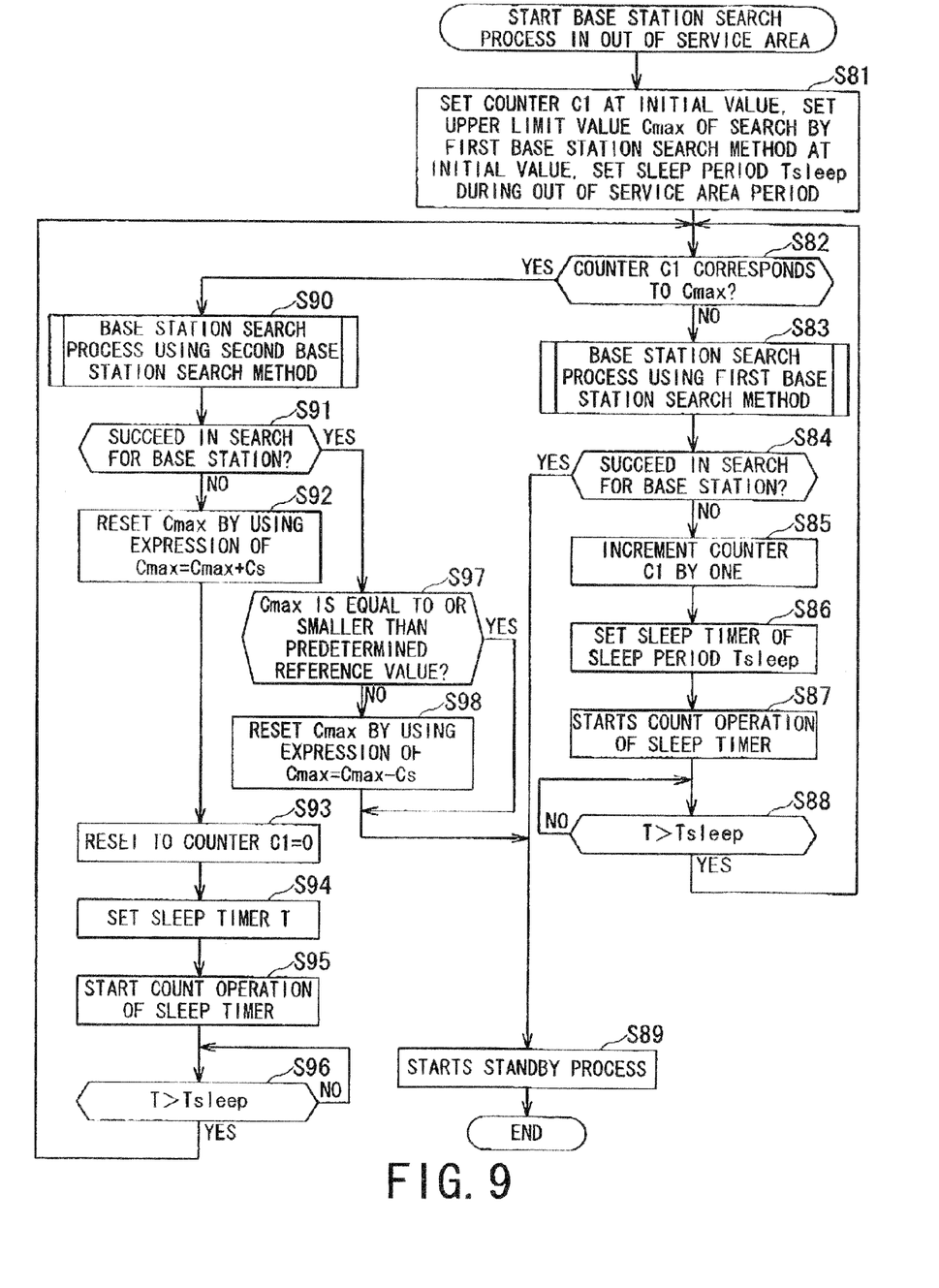
FIG. 9 is a flowchart explaining another base station search process in the out of service area in the mobile radio terminal of FIG. 1.

Contrary to the case of FIG. 9, when the present Cmax is equal to or larger than the predetermined reference value in the reset process of Cmax in step S12 of FIG. 2, it may be made unnecessary for the mobile radio terminal 1 to add Cs to the present Cmax value. Thereby, the Cmax value can be prevented from being equal to or larger than a predetermined reference value, and the base station search process using the second base station search method can be performed with the lowest frequency.

The mobile radio terminal 1 according to the present embodiment sets the search frequency by the base station search process using the second base station search method according to the ratio of the number of searches to the number of searches of the base station search process using the first base station search method. However, the present invention is not limited to such a case. The search time by the base station search process using the first base station search method and the search time by the base station search process using the second base station search method are respectively set, and according to the ratio of the search times by the base station search processes of both of them, the search frequency by the base station search process using the second base station search method may be set.

According to the present invention, in the case of search for a base station, power consumption is reduced, and reduction in the detection rate of the base station at the time of base station search can be favorably prevented.

A series of processes described in the embodiment of the present invention can be executed by software, but can be also executed by hardware.

In the embodiment of the present invention, the steps of the flowcharts show the examples of the processes which are performed in time series according to the described sequence, but the processes which are executed in parallel or individually and are not necessarily executed in time series are included in the present invention.

What is claimed is:

1. A mobile radio terminal, comprising:
 a communicating unit configured to perform radio communication with a base station belonging to a mobile communication network;
 a measuring unit configured to measure an electric field strength of a radio signal received by the communicating unit from a base station belonging to the mobile communication network;
 a first search unit configured to search for the base station by using a frequency at which the electric field strength of the radio signal measured by the measuring unit has a reference value or more out of a frequency group usable for communication with the base station belonging to the mobile communication network by the communicating unit;
 a second search unit configured to search for the base station by using the frequency group usable for communication with the base station belonging to the mobile communication network by the communicating unit; and
 a search control unit configured to perform control so as to search for the base station by the first search unit until a number of searches for the base station by the first search unit corresponds to an upper limit value of a number of searches previously set or stored, and to search for the base station by the second search unit if the base station search by the first search unit does not succeed by a time when the number of searches for the base station by the first search unit corresponds to the upper limit value previously set or stored.

2. The mobile radio terminal according to claim 1, wherein if the base station search by the second search unit succeeds, the search control unit resets the upper limit value previously set or stored to a value which is a result of subtracting a predetermined value from the upper limit value previously set or stored.

3. The mobile radio terminal according to claim 2, wherein the predetermined value which is subtracted from the upper limit value previously set or stored is a fixed value.

4. The mobile radio terminal according to claim 2, wherein the predetermined value which is subtracted from the upper limit value previously set or stored is variable in accordance with the upper limit value.

5. The mobile radio terminal according to claim 2, wherein when the base station search by the second search unit succeeds, and the upper limit value previously set or stored is a predetermined reference value or less, the search control unit keeps the upper limit value previously set or stored.

6. The mobile radio terminal according to claim 1, wherein if the base station search by the second search unit fails, the search control unit resets the upper limit value previously set or stored to a value which is a result of adding a predetermined value to the upper limit value previously or stored.

7. The mobile radio terminal according to claim 6, wherein the predetermined value which is added to the upper limit value previously set or stored is a fixed value.

8. The mobile radio terminal according to claim 6, wherein the predetermined value which is added to the upper limit value previously set or stored is variable in accordance with a number of failures of the base station search by the second search unit.

9. The mobile radio terminal according to claim 6, wherein when the base station search by the second search unit fails, and the upper limit value previously set or stored is a predetermined reference value or more, the search control unit keeps the upper limit value previously set or stored.

10. The mobile radio terminal according to claim 6, wherein after he search control unit resets the upper limit value previously set or stored, the search control unit searches for the base station by the first search unit until the number of searches for the base station by the first search unit corresponds to the upper limit value which is reset.

11. The mobile radio terminal according to claim 1, wherein if the base station search by the first search unit or the second search unit does not succeed, the search control unit starts a next base station search process by any one of the first search unit and the second search unit after a predetermined stop period elapses after the base station search process by any one of the first search unit and the second search unit ends.

12. The mobile radio terminal according to claim 1, wherein frequencies used when the second search unit searches for the base station include frequencies at which the electric field strengths of the radio signals measured by the measuring unit each have the reference value or more out of the frequency group usable for communication with the base station belonging to the mobile communication network by the communicating unit.

13. A base station search method, comprising:
- a communication step of performing radio communication with a base station belonging to a mobile communication network;
- a measurement step of measuring an electric field strength of a radio signal received from the base station belonging to the mobile communication network by a process of the communication step;
- a first search step of searching for the base station by using a frequency at which the electric field strength of the radio signal measured by a process of the measurement step has a reference value or more out of a frequency group usable for communication with the base station belonging to the mobile communication network by the process of the communication step;
- a second search step of searching for the base station by using the frequency group usable for communication with the base station belonging to the mobile communication network by the process of the communication step; and
- a search control step of performing control so as to search for the base station by a process of the first search step until a number of searches for the base station by the process of the first search step corresponds to an upper limit value of a number of searches previously set or stored, and to search for the base station by a process of the second search step if the base station search by the process of the first search step does not succeed by a time when the number of searches for the base station by the process of the first search step corresponds to the upper limit value previously set or stored.

14. The base station search method according to claim 13, wherein if the base station search by the process of the second search step succeeds, the upper limit value previously set or stored is reset to a value which is a result of subtracting a predetermined value from the upper limit value previously set or stored by a process of the search control step.

15. The base station search method according to claim 14, wherein the predetermined value which is subtracted from the upper limit value previously set or stored is a fixed value.

16. The base station search method according to claim 14, wherein the predetermined value which is subtracted from the upper limit value previously set or stored is variable in accordance with the upper limit value.

17. The base station search method according to claim 14, wherein if the base station search by the process of the second search step succeeds, and the upper limit value previously set or stored is a predetermined reference value or less, the upper limit value previously set or stored is kept by the process of the search control step.

18. The base station search method according to claim 13, wherein if base station search by the second search step fails, the upper limit value previously set or stored is reset to a value which is a result of adding a predetermined value to the upper limit value previously set or stored, by a process of the search control step.

19. The base station search method according to claim 18, wherein the predetermined value which is added to the upper limit value previously set or stored is a fixed value.

20. The base station search method according to claim 18, wherein the predetermined value which is added to the upper limit value previously set or stored is variable in accordance with a number of failures of the base station search by the process of the second search step.

21. The base station search method according to claim 18, wherein if the base station search by the process of the second search step fails, and the upper limit value previously set or stored is a predetermined reference value or more, the upper limit value previously set or stored is kept by the process of the search control step.

22. The base station search method according to claim 18, wherein after the upper limit value previously set or stored is reset, the base station is searched for by the process of the first search step until the number of searches for the base station by the process of the first search step corresponds to the upper limit value which is reset.

23. The base station search method according to claim 13, wherein if base station search by a process of the first search step or a process of the second search step does not succeed, a next base station search process by any one of the process of the first search step and the process of the second search step is started by a process of the search control step after a predetermined stop period elapses after the base station search process by any one of the process of the first search step and the process of the second search step ends.

24. The base station search method according to claim 13, wherein frequencies used if the base station is searched for by the process of the second search step include frequencies at which the electric field strengths of the radio signals measured by a process of the measurement step each have the reference value or more out of the frequency group usable for communication with the base station belonging to the mobile communication network by the process of the communication step.

25. A base station search method of a mobile radio terminal comprising a communicating unit that performs radio communication with a base station belonging to a mobile communication network, and a measuring unit that measures an electric field strength of a radio signal received by the communicating unit from the base station belonging to the mobile communication network, comprising:
- a first search step of searching for the base station by using a frequency at which the electric field strength of the radio signal measured by the measuring unit has a reference value or more out of a frequency group usable for communication with the base station belonging to the mobile communication network by the communicating unit;
- a second search step of searching for the base station by using the frequency group usable for communication with the base station belonging to the mobile communication network by the communicating unit; and
- a search control step of performing control so as to search for the base station by a process of the first search step until a number of searches for the base station by the process of the first search step corresponds to an upper limit value of a number of searches previously set or stored, and to search for the base station by a process of the second search step if the base station search by the process of the first search step does not succeed by a time when the number of searches for the base station by the process of the first search step corresponds to the upper limit value previously set or stored.

26. A mobile radio terminal, comprising:
- a communicating unit that performs radio communication with a base station belonging to a mobile communication network;

a measuring unit that measures an electric field strength of a radio signal received by the communicating unit from the base station belonging to the mobile communication network;

a first search unit that searches for the base station by using a frequency at which the electric field strength of the radio signal measured by the measuring unit has a reference value or more out of a frequency group usable for communication with the base station belonging to the mobile communication network by the communicating unit;

a second search unit that searches for the base station by using the frequency group usable for communication with the base station belonging to the mobile communication network by the communicating unit; and a search control unit that performs control so as to search for the base station by the first search unit until a search time for the base station by the first search unit corresponds to an upper limit value of a search time previously set or stored, and to search for the base station by the second search unit if the base station search by the first search unit does not succeed by a time when the search time for the base station by the first search unit corresponds to the upper limit value previously set or stored.

* * * * *